United States Patent
Ozguz et al.

(10) Patent No.: US 8,074,082 B2
(45) Date of Patent: Dec. 6, 2011

(54) ANTI-TAMPER MODULE

(75) Inventors: Volkan H. Ozguz, Aliso Viejo, CA (US);
John Leon, Anaheim, CA (US)

(73) Assignee: Aprolase Development Co., LLC, Wilmington, DE (US)

( * ) Notice: Subject to any disclaimer, the term of this patent is extended or adjusted under 35 U.S.C. 154(b) by 1007 days.

(21) Appl. No.: 11/248,659

(22) Filed: Oct. 11, 2005

(65) Prior Publication Data

US 2006/0087883 A1 Apr. 27, 2006

Related U.S. Application Data

(60) Provisional application No. 60/617,356, filed on Oct. 8, 2004.

(51) Int. Cl.
*G06F 11/30* (2006.01)
*G06F 1/26* (2006.01)

(52) U.S. Cl. ............. 713/194; 726/34; 726/35; 380/29; 380/264

(58) Field of Classification Search .................... 726/35, 726/36; 713/194, 152, 153, 164, 166, 183, 713/184, 192; 380/29, 52, 43, 272, 264, 380/44; 455/558; 326/8
See application file for complete search history.

(56) References Cited

U.S. PATENT DOCUMENTS

| | | | |
|---|---|---|---|
| 4,525,921 A | 7/1985 | Carson et al. | |
| 4,551,629 A | 11/1985 | Carson et al. | |
| 4,646,128 A | 2/1987 | Carson et al. | |
| 4,672,737 A | 6/1987 | Carson et al. | |
| 4,706,166 A | 11/1987 | Go | |
| 5,104,820 A | 4/1992 | Go et al. | |
| 5,347,428 A | 9/1994 | Carson et al. | |
| 5,349,249 A * | 9/1994 | Chiang et al. | 365/185.17 |
| 5,406,630 A | 4/1995 | Piosenka et al. | |
| 5,432,729 A | 7/1995 | Carson et al. | |
| 5,539,379 A | 7/1996 | MacPherson | |
| 5,613,012 A * | 3/1997 | Hoffman et al. | 382/115 |
| 5,688,721 A | 11/1997 | Johnson | |
| 5,824,571 A | 10/1998 | Rollender et al. | |
| 5,828,753 A * | 10/1998 | Davis | 713/189 |
| 5,858,500 A | 1/1999 | MacPherson | |
| 5,881,155 A * | 3/1999 | Rigal | 380/44 |
| 5,953,588 A | 9/1999 | Camien et al. | |
| 6,072,234 A | 6/2000 | Camien et al. | |
| 6,101,600 A * | 8/2000 | Arnold et al. | 713/1 |
| 6,117,704 A | 9/2000 | Yamaguchi et al. | |
| 6,356,958 B1 * | 3/2002 | Lin | 710/1 |
| 6,414,884 B1 * | 7/2002 | DeFelice et al. | 365/195 |
| 6,480,699 B1 * | 11/2002 | Lovoi | 455/41.2 |
| 6,560,109 B2 | 5/2003 | Yamaguchi et al. | |
| 6,706,971 B2 | 3/2004 | Albert et al. | |

(Continued)

FOREIGN PATENT DOCUMENTS

EP 0510433 10/1992

(Continued)

*Primary Examiner* — David Pearson
*Assistant Examiner* — Mohammad L Rahman

(57) ABSTRACT

An anti-tamper module is provided for protecting the contents and functionality of an integrated circuit incorporated in the module. The anti-tamper module is arranged in a stacked configuration having multiple layers. A connection layer is provided for connecting the module to an external system. A configurable logic device is provided for routing connections between the integrated circuit and the connection layer. Specifically, the configurable logic device is programmable to create logical circuits connecting at least one of the input/output connectors of the integrated circuit to at least one of the input/output connectors of the connection layer. Configuration information for programming the reconfigurable logic device is stored in a memory within the module.

63 Claims, 8 Drawing Sheets

U.S. PATENT DOCUMENTS

| | | |
|---|---|---|
| 6,717,061 B2 | 4/2004 | Yamaguchi et al. |
| 6,734,370 B2 | 5/2004 | Yamaguchi et al. |
| 6,806,559 B2 | 10/2004 | Gann et al. |
| 6,829,237 B2 | 12/2004 | Carson et al. |
| 6,856,167 B2 | 2/2005 | Ozguz et al. |
| 7,203,842 B2 * | 4/2007 | Kean .................... 713/189 |
| 2002/0104872 A1 | 8/2002 | DeFelice et al. |
| 2004/0129939 A1 * | 7/2004 | Matsuo et al. ............ 257/48 |

FOREIGN PATENT DOCUMENTS

| | | |
|---|---|---|
| FR | 2798002 | 3/2001 |
| WO | WO 0150530 A1 * | 7/2001 |

* cited by examiner

ANTI-TAMPER MODULE

This application claims the benefit of U.S. Provisional Application No. 60/617,356, filed Oct. 8, 2004, which is hereby incorporated herein by reference.

FIELD OF THE INVENTION

The present invention concerns the protection of devices from tampering and, in particular, concerns a module having multiple anti-tamper mechanisms incorporated therein.

BACKGROUND OF THE INVENTION

Maintaining technological advantages over an opponent is often a critical factor for success both in the business world and on the battlefield. These advantages become difficult to maintain once the opponent gains access to the technology. For example, a business competitor may obtain an early version of a new product to examine it in order to identify its key features and functionality. Similarly, a military vehicle or weapon may be lost into enemy hands. The enemy can then examine the electrical components in an effort to understand features and functionality of the vehicle or weapon in order to devise technology to defeat the vehicle or weapon in the future.

Custom made devices are often the most difficult to analyze. However, increasing demands to reduce both development time and overall costs have led to an increased reliance on off-the-shelf components to implement devices. The use of off-the-shelf components gives an opponent a head start at examining the device since the features and functionality of the individual components are easily obtained. Additionally, conventional techniques for arranging the components within a device often facilitate visual identification of both the individual components and many of the connections between the components.

Accordingly, a need exists to develop anti-tamper technology that inhibits the ability of an opponent to examine and/or reverse engineer sensitive devices to learn key features and functionality. This need has been increased due to a directive issued by the United States government that critical designs in military applications must be tamper proof.

SUMMARY OF THE INVENTION

The present invention addresses the foregoing needs by providing a generic platform for protecting the features and functionality of one or more components using multiple anti-tamper mechanisms. Significant innovations of the invention can be categorized into three general anti-tamper mechanisms. The first mechanism is the use of a stacking architecture to assemble the anti-tamper module. The second mechanism is the rerouting of connections within the module. Finally, the third mechanism is the incorporation of code in the module for controlling access to the components. This code is generally referred to as a key. The invention uses different combinations and variations of these three mechanisms, as well as others described in the detailed description, to provide an innovative anti-tamper module.

According to one aspect of the invention, an anti-tamper module is provided for protecting the contents of an integrated circuit. The anti-tamper module includes a connection layer having an input/output connector for connecting the module to an external system. A memory connected to the connection layer stores code for controlling access to the contents of the integrated circuit, which also is connected to the connection layer. The components of the anti-tamper module are arranged in a stacked configuration.

According to another aspect of the invention, an anti-tamper module is provided for protecting the contents of an integrated circuit. The anti-tamper module includes a connection layer having input/output connectors for connecting the anti-tamper module to an external system. The integrated circuit also includes input/output connectors. A configurable logic device is connected to both the connection layer and the integrated circuit. The configurable logic device is configured to create logical circuits connecting at least one of the input/output connectors of the connection layer to at least one of the input/output connectors of the integrated circuit. The components of the anti-tamper module are arranged in a stacked configuration.

According to another aspect of the invention, an anti-tamper module is provided for protecting the contents of an integrated circuit. The anti-tamper module includes a connection layer having input/output connectors for connecting the anti-tamper module to an external system. The integrated circuit also includes input/output connectors. A configurable logic device is connected to both the connection layer and the integrated circuit. The configurable logic device is configured to create logical circuits connecting at least one of the input/output connectors of the connection layer to at least one of the input/output connectors of the integrated circuit. The anti-tamper module further includes a memory storing code for controlling access to the contents of the integrated circuit. The components of the anti-tamper module are arranged in a stacked configuration.

The foregoing summary of the invention has been provided so that the nature of the invention can be understood quickly. A more detailed and complete understanding of the preferred embodiments of the invention can be obtained by reference to the following detailed description of the invention together with the associated drawings.

DETAILED DESCRIPTION OF THE INVENTION

Figure 1:
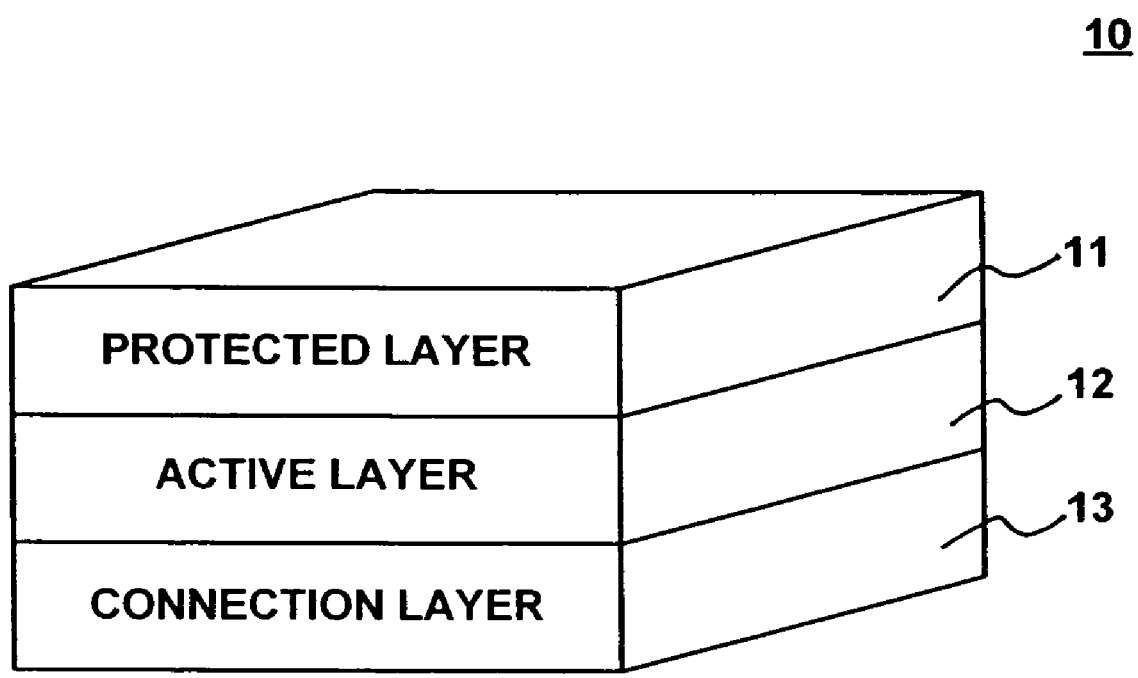
FIG. 1 is a diagram depicting the generic components of an anti-tamper platform provided by the invention.

The invention will now be described more fully with reference to the accompanying drawings, wherein like reference numerals refer to like elements throughout the drawings. The following description includes preferred embodiments of the invention provided to describe the invention by way of example to those skilled in the art.

The invention provides a generic platform for protecting the contents of one or more integrated circuits from unauthorized access or tampering. FIG. 1 is a diagram depicting the generalized layers of an anti-tamper module 10 according to one embodiment of the invention. Anti-tamper module 10 includes a protected layer 11, an active layer 12 and a connection layer 13. Protected layer 11 represents one or more integrated circuits protected within anti-tamper module 10. Possible integrated circuits include, but are not limited to, random access memory (RAM), processors, application-specific integrated circuits (ASIC), etc. For purposes of this description, the contents of an integrated circuit refer to any code and/or data stored within the integrated circuit as well as the structure and functionality of the integrated circuit itself.

Active layer 12 represents hardware components used to provide one or more anti-tamper mechanisms. These anti-tamper mechanisms are used to inhibit the unauthorized probing and reverse engineering of an integrated circuit incorporated within the module. These hardware components include memory, both volatile and non-volatile, and configurable logic devices such as field programmable gate arrays (FPGA) and field programmable interconnect devices (FPID). The operation of the hardware components and their associated anti-tamper mechanisms will be described in more detail below.

Connection layer 13 represents the input/output connection used to connect anti-tamper module 10 to an external system that uses the one or more integrated circuits within protected layer 11 for operation. Connection layer 13 includes one or more connectors used to electrically communicate signals between the external system and anti-tamper module 10. The connectors may be balls within a ball grid array (BGA), pins, or other types of connectors known to those skilled in the art. In addition, connection layer 13 may implement a known interface standard, such as the Peripheral Component Interconnect (PCI) standard, for communication between the external system and anti-tamper module 10.

FIG. 1 shows a single protected layer 11 and a single active layer 12. It is to be understood that the invention is not limited to this arrangement. As will be appreciated by one skilled in the art, the anti-tamper module may include multiple protected layers 11 and/or multiple active layers 12.

Figure 2A:
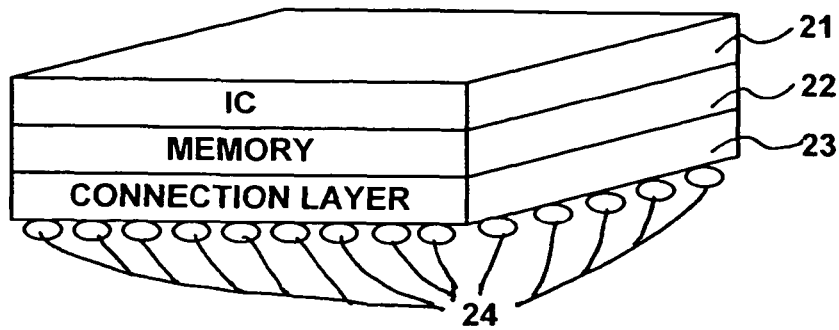
FIGS. 2A, 2B and 2C are diagrams depicting three primary configurations of an anti-tamper module according to three embodiments of the invention.
Figure 2B:
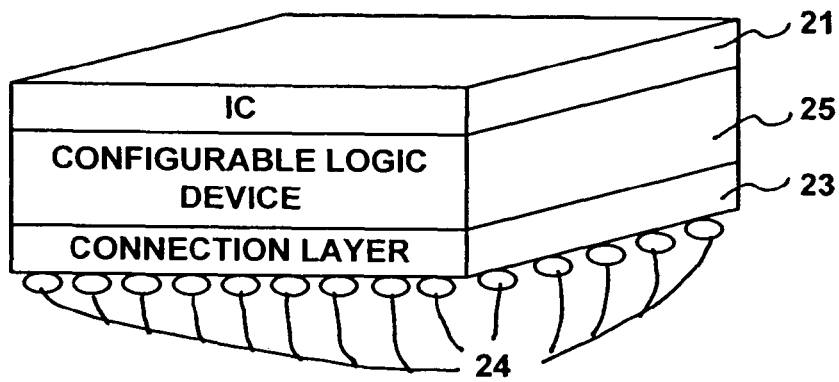
Figure 2C:
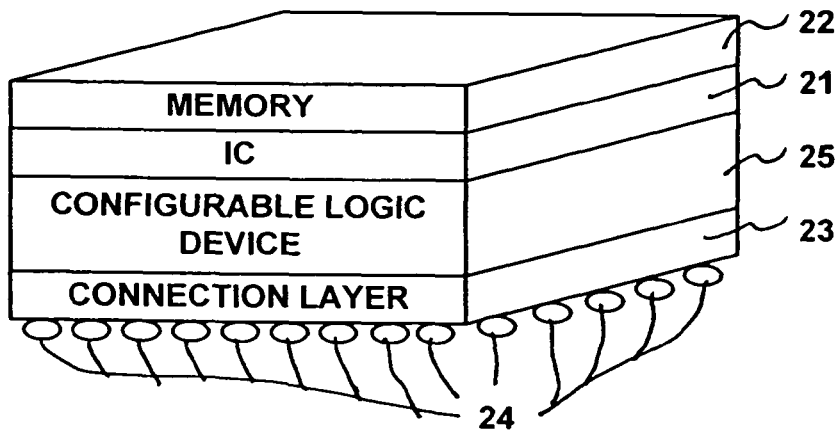

FIGS. 2A, 2B and 2C depict three general configurations of the invention. FIG. 2A depicts the configuration of anti-tamper module 20a according to one embodiment of the invention. Anti-tamper module 20a includes integrated circuit (IC) 21, memory 22 and connection layer 23. IC 21 represents one or more integrated circuits whose contents are protected by anti-tamper module 20a. Memory 22 represents a memory which stores code for controlling access to the contents of IC 21. Connection layer 23 connects anti-tamper module 20a to an external system (not shown) using connectors 24. Connectors 24 represent balls in a BGA, pins or other connectors known to those skilled in the art.

FIG. 2B depicts the configuration of anti-tamper module 20b according to another embodiment of the invention. As with anti-tamper module 20a, anti-tamper module 20b includes IC 21, connection layer 23 and connectors 24. Also included in anti-tamper module 20b is configurable logic device 25, which is configurable to create logical circuits connecting at least one input/output connector of IC 21 to at least one connector 24 of connection layer 23.

FIG. 2C depicts the configuration of anti-tamper module 20c according to another embodiment of the invention. Anti-tamper module 20c includes IC 21, connection layer 23 and connectors 24. Additionally, anti-tamper module 20c includes memory 22, as in anti-tamper module 20a, and configurable logic device 23, as in anti-tamper module 20b.

The invention is not limited to the embodiments depicted in FIGS. 2A, 2B and 2C. Alternative embodiments of the invention may include multiple ICs 21, memories 22 and/or configurable logic devices 25. Additionally, the order in which the components of the anti-tamper module are stacked may be varied in different embodiments. The functions and anti-tamper mechanisms provided by these components will be described in more detail below.

As shown in FIGS. 2A, 2B and 2C, the components of the anti-tamper modules are arranged in a stacked configuration. The components are stacked and interconnected using any of a number of stacking techniques known to those skilled in the art. For example, Irvine Sensors Corporation has developed several patented techniques for stacking and interconnecting multiple integrated circuits. Some of these techniques are set forth in U.S. Pat. Nos. 4,525,921; 4,551,629; 4,646,128; 4,706,166; 5,104,820; 5,347,428; 5,432,729; 5,688,721; 5,953,588; 6,117,704; 6,560,109; 6,706,971; 6,717,061; 6,734,370; and 6,806,559; each of which are hereby incorporated herein by reference.

Generally speaking, components containing integrated circuits are bonded together one on top of another so as to maintain a footprint equivalent to that of a single component. The input/output connections of the individual components are routed to the edges of the components. This routing may be due to component packaging, such as thin small-outline packaging, or may be done using interposers positioned between the components to accommodate other types of component packaging. Interposers typically are printed circuit boards connected to a component using a BGA or some other type of connection mechanism. Conductive traces formed on the interposer route the input/output connections of the component to the edges of the interposer.

Figure 3:
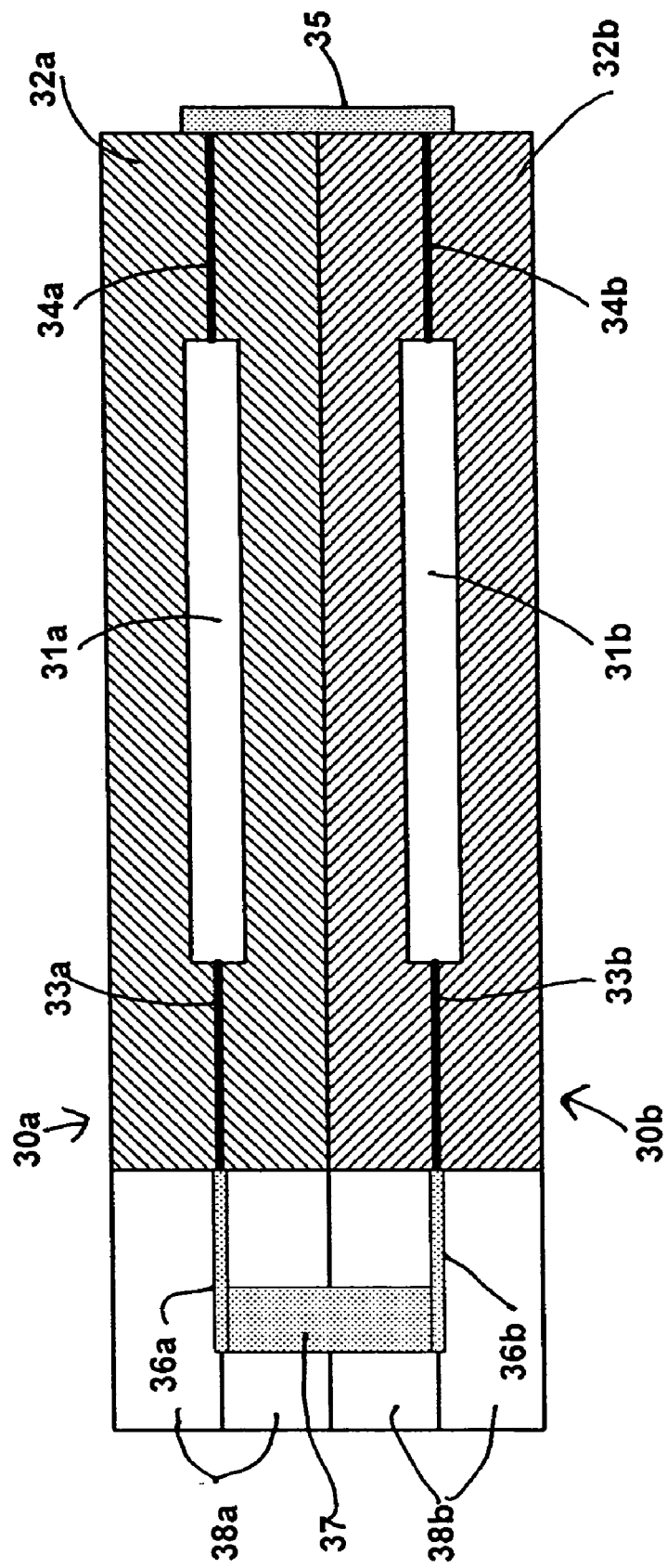
FIG. 3 is a cross-section of two components depicting two examples of interconnecting techniques used to form an anti-tamper module according to one embodiment of the invention.

By routing the input output connections to the edges of the components and/or interposers, the input/output connections are accessible on the sides of the component stack. These input/output connections are then interconnected on the sides of the component stack using techniques such as those described in the patents identified above. FIG. 3 is a cross section of two components showing two examples of interconnection techniques. As depicted in FIG. 3, component 30a is stacked and bonded on top of component 30b. Component 30a includes integrated circuit 31a encapsulated in packaging material 32a. Similarly, component 30b includes integrated circuit 31b encapsulated in packaging material 32b. Input/output connectors 33a and 34a extend through packaging material 32a to the edges of component 30a. Likewise, input/output connectors 33b and 34b extend through packaging material 32b to the edges of component 30b.

One technique exemplified in FIG. 3 is the use of a conductive trace or wire 35 to interconnect input/output connectors 34a and 34b. Metal trace or wire 35 is formed on the edge of the component stack to interconnect the two components.

Another technique exemplified in FIG. 3 is the use of metallization and vias to interconnect components. As depicted, conductive trace or wire 36a extends from input/output connector 33a and a conductive trace or wire 36b extends from input/output connector 33b. These two conductive traces or wires are interconnected with metal filled within via 37 formed through filing materials 38a and 38b. A variety of materials known to those skilled in the art can be used for packing materials 32a and 32b and filing materials 38a and 38b.

The use of vias such as via 37 provides certain advantages over the use of a conductive wire or trace formed on the edge of the component stack. For example, the use of vias both hides and protects the interconnections between components with the stack. However, different embodiments of the invention may use either of these techniques by themselves, or a combination of these techniques to interconnect components. In addition, it is noted that FIG. 3 only depicts one interconnection on each side of the stack. One skilled in the art will recognize that the present invention contemplates several such interconnections on one or more sides of the component stack of an anti-tamper module arranged according to different embodiments of the invention.

The routing and interconnection of input/output connectors within the anti-tamper module provide an anti-tamper mechanism by allowing the input/output connectors accessible to an external system to be scrambled. As described above, the input/output connectors of the components stacked in the anti-tamper module are routed to the edges of the stack and then interconnected. This allows the arrangement of the input/output connectors of one component connected to the connection layer to be different than the arrangement of the input/output connectors of the connection layer itself.

Figure 4A:
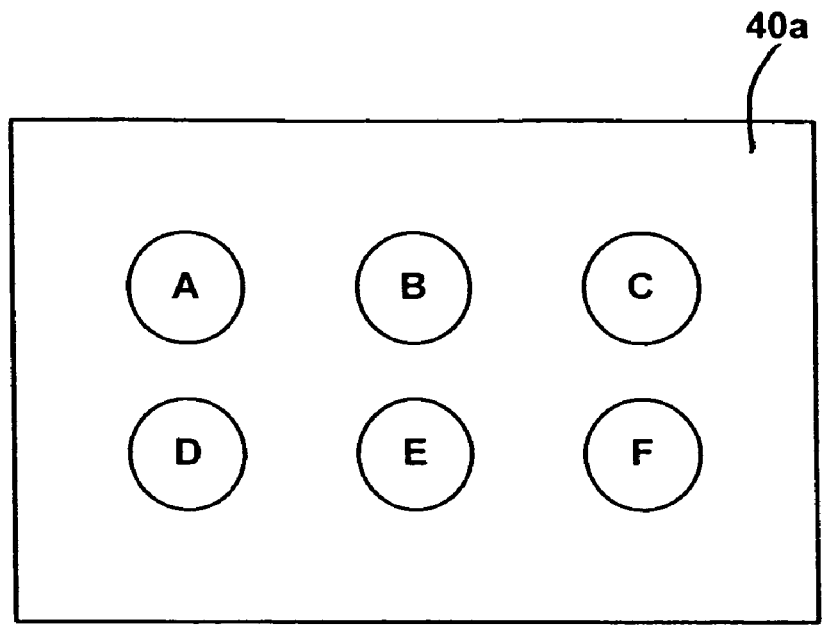
FIGS. 4A and 4B are diagrams depicting the arrangements of input/output connectors on components witin an anti-tamper module according to one embodiment of the invention.
Figure 4B:
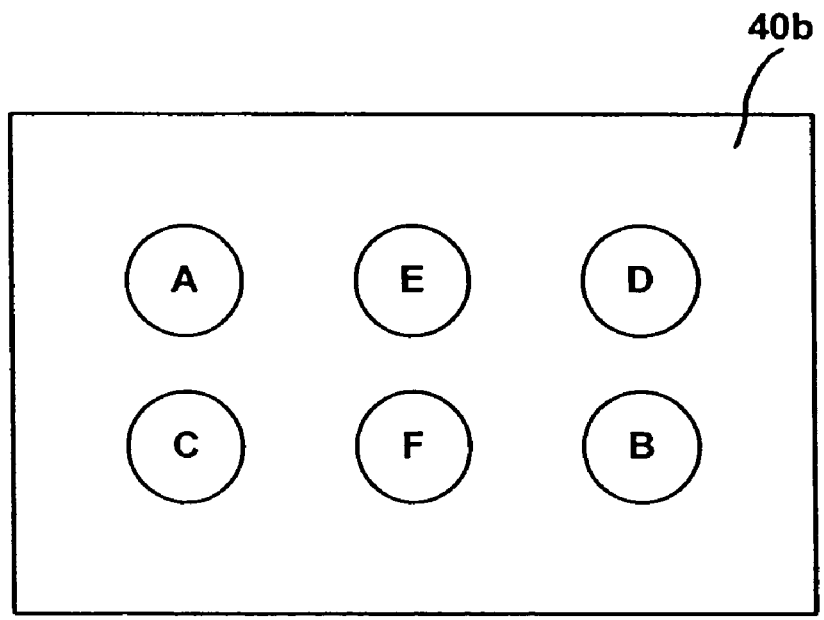

FIGS. 4A and 4B depict a simple example of this rearrangement. FIG. 4A includes a component 40a having six input/output connectors A, B, C, D, E and F. Component 40a represents a protected integrated circuit within an anti-tamper module or some other component within the stack. FIG. 4B includes connection layer 40b having six input/output connectors for connecting to an external system. The input/output connectors shown in FIG. 4B are labeled to indicate connections to the six input/output connectors A, B, C, D, E and F of component 40a in FIG. 4A. Comparing FIGS. 4A and 4B demonstrates a simple example of modifying the arrangement of the input/output connectors of component 40a as accessible by an external system through connection layer 40b. If the proper arrangement of the input/output connectors on connection layer 40b is unknown to an unauthorized user, the ability to correctly access and use component 40a in an anti-tamper module is greatly reduced.

Another anti-tamper mechanism is provided by configurable logic device 25. Specifically, configurable logic device 25 is used to logically re-route connections between components within an anti-tamper module. As mentioned above, configurable logic device 25 represents a reconfigurable device, such as a field programmable gate array or a field programmable interconnect device, that is capable of being configured to form logical circuits connecting different input/output connectors. The logical circuits are created using configuration information such as code in a hardware description language that is loaded into configurable logic device 25. This code may be loaded at the time of manufacture or first use to permanently configure the logical circuits, thereby hardwiring configurable logic device 25. Alternatively, the code may be loaded when the anti-tamper device is connected to an external system via connection layer 23 and is provided power to execute configuration processes. Another alternative is to store the code in memory 22 or in a portion of configurable logic device 25 configured as memory, and load the code from this location rather than from an external system. The general structure and techniques for programming FPGAs and FPIDs are known to those skilled in the art and will not be discussed further in this description.

Except in the hardwired alternative mentioned above, the logical circuits within configurable logic device 25 are disconnected when the anti-tamper module is disconnected from power. Accordingly, when the anti-tamper module is removed from a system, connections within the module that are necessary for operation cannot be probed through connection layer 23. Instead, probing the anti-tamper module when removed from a system leads to dead-end connections sometimes referred to as cul-de-sacs.

Figure 5:
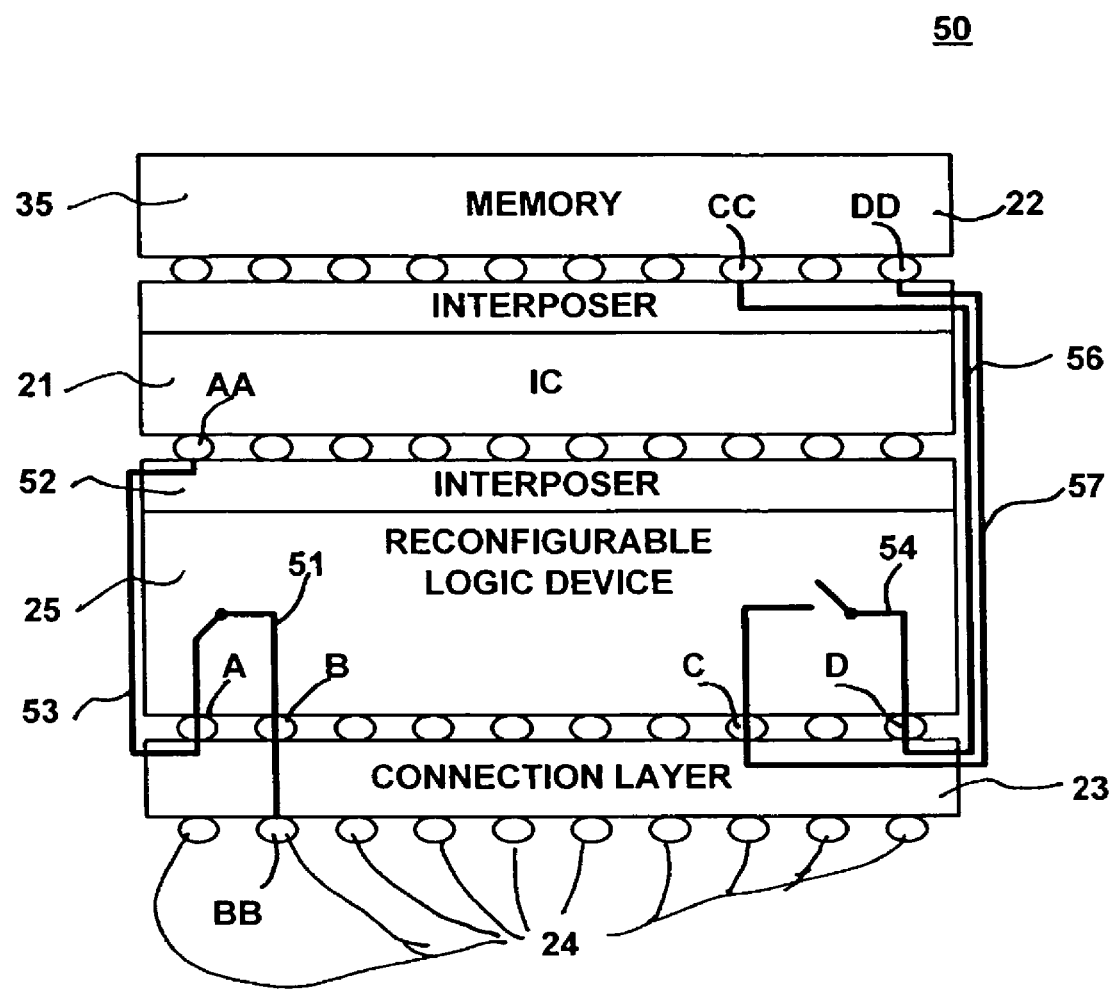
FIG. 5 is a diagram depicting the logical rerouting of connections between components in an anti-tamper module according to one embodiment of the invention.
Figure 6:
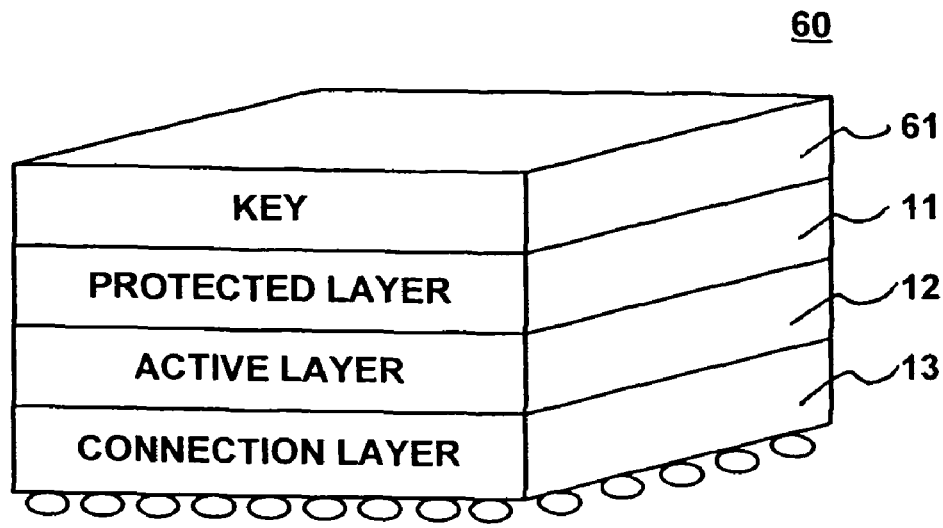
FIG. 6 is a diagram depicting the components of an anti-tamper module according to one embodiment of the invention.

FIG. 5 is a block diagram depicting the re-routing of connections between components within anti-tamper module 50 according to one embodiment of the invention. As shown in FIG. 5, logical circuit 51 is formed between connectors A and B of configurable logic device 25. Logical circuit 51 routes the connection between connector AA of integrated circuit 21 and connector BB of connectors 24 through configurable logic device 25. Specifically, the connection is routed from connector AA to the edge of the module through interposer 52. Conductor 53 routes the connection down the side of the component stack to connection layer 23. Connection layer 23 routes the connection to connector A and routes the connection from connect B to connector BB of connectors 24.

In a similar manner, logical circuit 54 is formed between connectors C and D of configurable logic device 25. Logical circuit 54 routes the connection between connectors CC and DD of memory 22 through configurable logic device 25. Specifically, the connection is routed from connector CC to the edge of the module through interposer 55. Conductor 56 routes the connection down the side of the component stack to connection layer 23. Connection layer 23 routes the connection to connector C and routes the connection from connector D back to the edge of the component stack. Conductor 57 routes the connection up the side of the component stack to interposer 55, which routes the connection to connector DD of memory 22. Unlike logical circuit 51, however, logical circuit 54 is shown as being open thereby leaving connectors CC and DD disconnected.

FIG. 5 depicts two connections re-routed through configurable logic device 25, with one of the connections configured to connect one of the components to an external system through connection layer 23 and the other connection configured to remain within anti-tamper module 50. It is to be understood, however, that more than one of each of these types of configurable connections can and preferably are used to re-route connections within anti-tamper module 50. In this manner, the input/output connectors 24 are not necessarily in a one-to-one correspondence with the internal connections of the module. Additionally, other physical connections between components will be hidden within the component stack. In this manner, the invention makes it more difficult to determine the contents of the module by probing input/output connectors 24. Additionally, the functional arrangement of the input/output connectors 24 can be scrambled using different configurations within configurable logic device 25.

According to one embodiment of the invention, one or more keys are incorporated in an anti-tamper module as an additional anti-tamper mechanism. For purposes of this description, keys are generally defined as code used to control access to the contents of integrated circuits in the protected layer of an anti-tamper module. Keys useful in the present invention include passwords or data patterns used to authorize access to integrated circuit 21, executable code used to perform algorithms necessary to access the contents of integrated circuit 21, cryptographic keys used for data encryption/decryption, encryption/decryption algorithms for encrypting/decrypting data, etc. The invention is not limited to specific types of the keys mentioned above and can include many types and variations known to those skilled in art. For example, the lengths and complexities of the keys may vary. In addition, a number of encryption algorithms, such as those based on the Advanced Encryption Standard, may be used. The significant aspects of the keys in the invention involve how the keys are incorporated into the anti-tamper module. Multiple levels of security can be established by incorporating different types and numbers of keys in the anti-tamper module. Depending on the application and the environment the anti-tamper module is to be used in, an appropriate level of security can be selected and implemented in the module.

A first level of security uses a software key that is stored on a computing device separate from the anti-tamper module. When the anti-tamper module is connected to an external system, the software key is loaded into the anti-tamper module. Preferably, the software key is stored in memory 22. Alternatively, the software key can be stored in a portion of configurable logic device 25 that has been configured as memory. This type of key can be used with an Access Control List to provide multiple levels of access to the module. This type of key also can be modified during operation of the anti-tamper module.

A second level of security uses a software key that is stored within the anti-tamper module. The software key may be stored in memory 22 of an anti-tamper module such as those depicted in FIGS. 2A and 2C. Alternatively, the software key may be stored in a portion of configurable logic device 25 configured as a memory in anti-tamper modules such as those depicted in FIGS. 2B and 2C. As another alternative, the key may be programmed into configurable logic device 25. As with the logic circuits described above, when the anti-tamper module is connected to an external system and is powered up, configuration information is loaded into configurable logic device 25 to program a software key therein. By modifying the configuration information, the software key is reconfigurable and can vary in length and type.

One example of the second level key described above is a password or encryption key necessary to access the contents of integrated circuit 21 in the anti-tamper module depicted in FIG. 2A. In this embodiment, a password or encryption key is stored in memory 22. When anti-tamper module 20a is connected to an external system, the external system must access a specific portion of memory 22 to retrieve the password or encryption key in order to access integrated circuit 21. Without the password or encryption key, access to integrated circuit will be prohibited, or at a minimum will produce a useless output. In this manner, an unauthorized user of the anti-tamper module will be impeded in attempts to access the contents of integrated circuit 21 by requiring the user to be aware of the need to retrieve the password or encryption key, requiring knowledge of where the password or encryption key is stored and how to access it, and requiring knowledge of how the password or encryption key is used to control access.

As mentioned above, the present invention provides a generic platform for protecting the contents of an integrated circuit. The stacked architecture used to assemble the anti-tamper module gives this platform the ability to add functionality to the anti-tamper module by incorporating additional layers into the component stack. In FIGS. 6 to 9, this generic platform is represented by protected layer 11, active layer 12 and connection layer 13, similar to the layers described in FIG. 1. Each of FIGS. 6 to 9 generally depicts the addition of functional layers to the anti-tamper module to provide additional functionality and improved anti-tamper mechanisms. At this time it is noted that with the exception of connection layer 13 being located at the base of the anti-tamper module, the order of the arrangement of components can vary in different embodiments of the invention.

A third level of key security uses a firmware or hard key that is embedded within the component stack. Such a key is represented by key 61 incorporated into the component stack of anti-tamper module 60 shown in FIG. 6. Typically, the hard key is a physical electronic key implemented in a chip that is included in the stack of components at the time of manufacturing anti-tamper module 60. Unlike the soft keys mentioned above, the hard key is fixed at the time of manufacture and is not reconfigurable. However, the presence of hard key 61 is difficult to detect within the component stack. Even if the presence of hard key 61 is known, an understanding of how the hard key functions and is integrated with the other components in the stack is necessary to be able to reverse engineer the module to gain access to the contents of protected layer 11.

While three separate levels of key security have been described above, it is to be understood that different combinations of these security levels can be used in alternative embodiments of the invention. Additionally, multiple instances of each security level can be implemented in the invention. For example, the anti-tamper module can be configured to utilize hard key 61 embedded in the component stack, two soft keys programmed into a configurable logic device within active layer 12, and a soft key received via a connected external system. One skilled in the art will recognize other combinations of capable of use within the anti-tamper module without departing from the scope of the invention.

Figure 7:
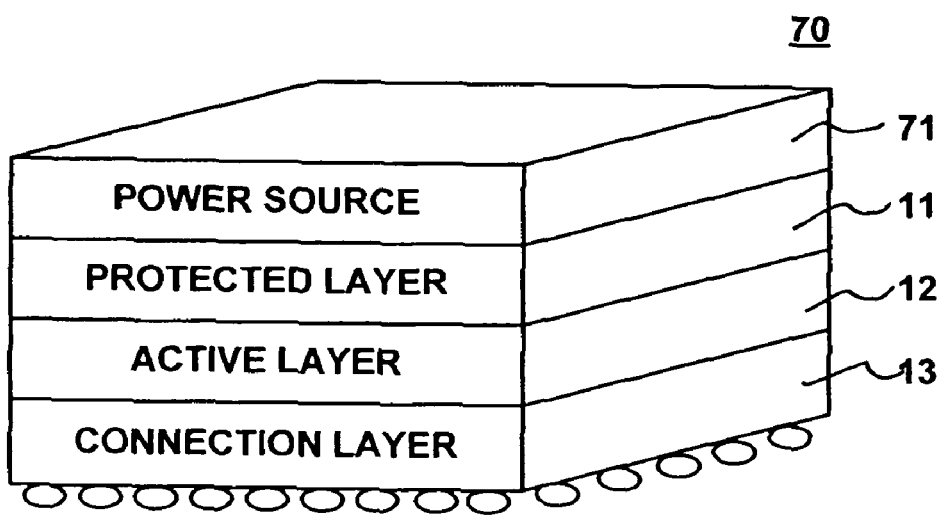
FIG. 7 is a diagram depicting the components of an anti-tamper module according to one embodiment of the invention.

FIG. 7 is a diagram depicting anti-tamper module 70 according to one embodiment of the invention. As shown in FIG. 7, anti-tamper module 70 includes an internal power source 71 incorporated within the component stack. Typically, power source 71 is a battery having a life cycle sufficient for the particular application the anti-tamper module is to be used for. Power source 71 can be a rechargeable battery capable of recharging itself when the anti-tamper module is connected to an external system providing power to the module. Alternatively, the battery may be arranged within the component stack to have no connections to an external system through connection layer 13, thereby making detection of the battery difficult. Power source 71 provides power to anti-tamper module 70, thereby allowing one or more operations or functions to be executed within anti-tamper module 70 regardless of whether the module is connected to and receiving power from an external system. Exemplary operations and functions are described below.

One set of operations facilitated by the incorporation of power source 71 in the component stack is the zeroization of code within the anti-tamper module. To prevent the unauthorized access of the contents of a protected integrated circuit, the anti-tamper module is configured to remove traces of certain functionality within the module. This functionality includes, but is not limited to, the logical circuits programmed in the configurable logic device, software keys programmed in the configurable logic device, software keys stored in the memory, and configuration information for programming the configurable logic device stored within the anti-tamper module.

When the anti-tamper module is disconnected from an external system and/or power to the anti-tamper module is removed, the configuration of any configurable logic device that is not hardwired is lost. In this state, the configurable logic device is no longer able to provide the previously programmed functionality. However, sophisticated probing and/or imaging techniques may be able to recover the previous states of the electronic components within the configurable logic device. Using the recovered states, the operating configuration of the configurable logic device could possibly be recreated thereby allowing unauthorized access to the contents of the protected integrated circuit. To prevent the recovery of the previous states, code containing a series of read/write commands is executed to place the electronic components in a default state such as a zero state. Code containing a similar series of read/write commands also can be executed to place the electronic components of the memory in a default state, thereby erasing any code, keys or data stored therein. This process is referred to as zeroization.

The reset or zeroization code is stored within the anti-tamper module. For example, a non-active portion of the configurable logic device may be set aside for storing the zeroization code. Storing the code in a non-active portion of the device helps ensure that the code is not unintentionally accessed and executed. Alternatively, the zeroization code may be stored in a non-volatile section of the memory. The zeroization code is executed by a processor within the anti-tamper module. The configurable logic device, such as an FPGA, may be configured to include one or more processors for this purpose. Alternatively, a separate processor may be incorporated as a layer within the component stack of the anti-tamper module. One skilled in the art will recognize appropriate processors capable of performing these functions.

The zeroization code is executed in response to a trigger event. The trigger event may be a command or code received by the anti-tamper module, or it can be a detected condition or state of the module. To allow the code to be executed regardless of whether the module is connected to an external system or not, power source 71 is used to provide sufficient power to execute the zeroization code. Some examples of trigger events are provided below.

In addition to providing power to execute operations or functions with the anti-tamper module, power source 71 also can provide internal power for other uses. For example, power source 71 may provide power to maintain data storage in volatile memory within the component stack of the anti-tamper module. Referring back to FIG. 2A, if memory 22 is implemented using volatile memory, power must be maintained to memory 22 in order to retain the code stored therein. Power source 71 can provide this power for the useful life of the anti-tamper module.

Figure 8:
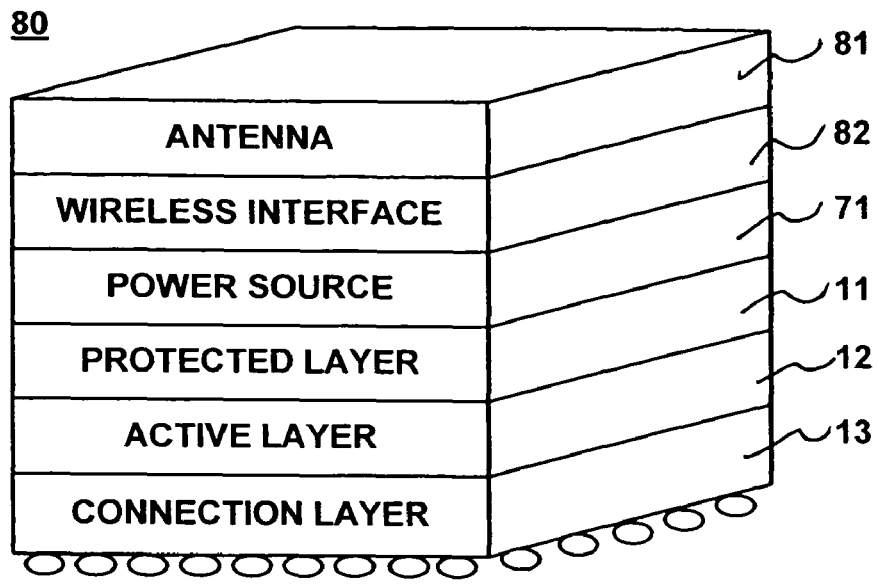
FIG. 8 is a diagram depicting the components of an anti-tamper module according to one embodiment of the invention.

In another embodiment of the invention, wireless functionality is added to anti-tamper module 80 depicted in FIG. 8. As shown in FIG. 8, wireless functionality is added by incorporating antenna 81 and wireless interface 82 into the component stack. To provide power to antenna 81 and wireless interface 82 when the anti-tamper module is not powered by an external system, power source 71 also is included within the component stack. Antenna 81 and wireless interface 82 allow anti-tamper module 80 to send and receive data using any of a number of wireless protocols. For example, heavily encrypted spread-spectrum wireless protocols may be used to securely transmit and/or receive data. Antenna 81 and wireless interface 82 may be used to receive a radio frequency encryption key which is then stored in a memory within active layer 12 to protect access to the contents of an integrated circuit within protected layer 11. In addition, antenna 81 and wireless interface 82 may receive unique code as a signal that the zeroization code described above be executed within the anti-tamper module. Accordingly, a trigger event may occur when the anti-tamper module receives the unique code.

Antenna 81 can be implemented using any of a number of designs known to those skilled in the art. Typically, antenna 81 is formed by depositing metal on a substrate and shaping the metal into the desired antenna configuration. An antenna formed in this manner, allows the presence of the antenna within the anti-tamper module to be less noticeable and possibly hidden from inspection of the anti-tamper module. Wireless interface 82 includes the necessary circuitry to receive a radio signal via antenna 81, decode the radio signal, convert the signal into digital format for use by other components within the anti-tamper module. Typical receivers, converters, processors, controllers, etc. used to implement wireless interface 82 are generally known and will not be described further herein. Any of a number of designs and configurations known to those skilled in the art can be used for antenna 81 and wireless interface 82.

Figure 9:
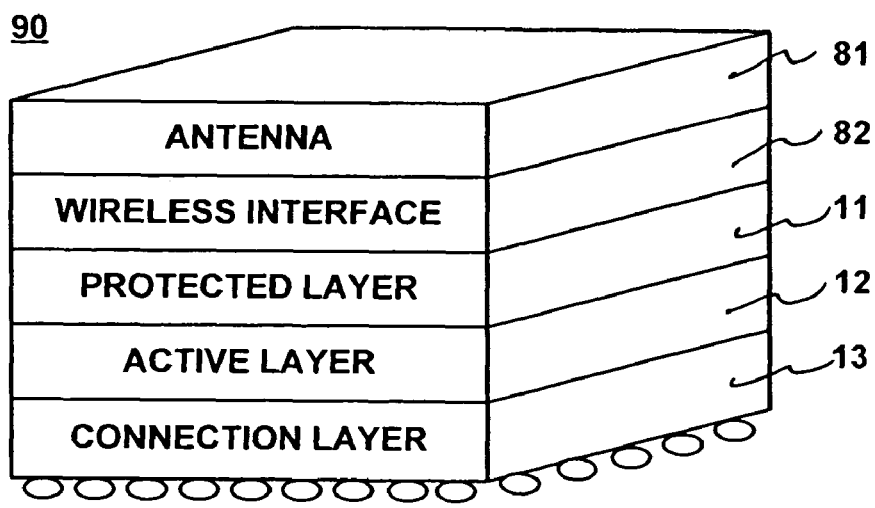
FIG. 9 is a diagram depicting the components of an anti-tamper module according to one embodiment of the invention.

In a variation of the anti-tamper module shown in FIG. 8, FIG. 9 depicts anti-tamper module 90 having antenna 81 and wireless interface 82 incorporated within the component stack. Unlike the embodiment shown in FIG. 8, anti-tamper module 90 does not include power source 71. In this embodiment of the invention, an alternative to power source 71 is provided by using inductive coupling with antenna 81. Specifically, when radio frequency signals are received by antenna 81, a current is induced in the antenna. Wireless interface 82 is configured to include circuitry to capture this current and distribute power internally to other components within anti-tamper module 90. This type of power source is commonly used today in radio frequency ID tags and tollway transponders. Using this alternative power source, anti-tamper module 90 can be provided with power to perform specific operations and functions such as the execution of the zeroization code discussed above.

The functional features mentioned above with reference to FIGS. 6 to 9 have been described as being incorporated individually into the anti-tamper module. It is to be understood, that any combination of these functional features can be implemented within a single anti-tamper module without departing from the scope of the invention. It is further noted that the functionality of the anti-tamper module is scalable. For example, multiple instances of the functional layers described with reference to FIG. 6 to 9 can be incorporated into the component stack and additional configurable logic devices, memory modules, and/or integrated circuits also can be incorporated into the component stack to increase the functionality of the module.

Figure 10:
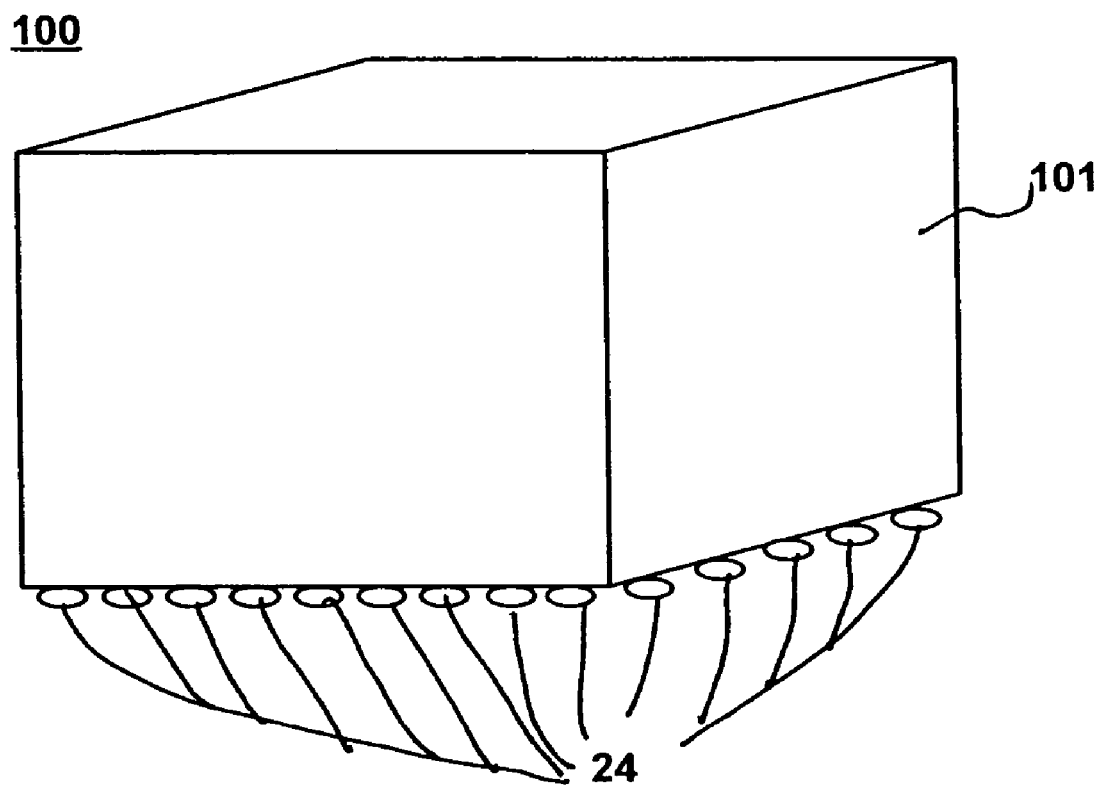
FIG. 10 is a diagram depicting an anti-tamper module encased in a protective layer according to one embodiment of the invention.

As another anti-tamper mechanism, the anti-tamper module is typically encased in a protective layer. In one embodiment of the invention, the protective layer is a passive protection device that impedes inspection of the anti-tamper module. As shown in FIG. 10, anti-tamper module 100 is encased by protective layer 101. In this embodiment, only connectors 24 extend through the protective layer to allow the anti-tamper module to be connected to an external system. Other components of the anti-tamper module may not be encased by protective layer 101 in other embodiments of the invention.

The first level of protection offered by protective layer 101 is impeding visual inspection of the anti-tamper module. Preferably, protective layer 101 includes an opaque material, such as an epoxy or a metal, that prevents visual inspection of the individual components within anti-tamper module 100 as well as any interconnects formed on the side of the component stack. In this manner, the anti-tamper module appears as a single component rather than a stack of multiple components, thereby making discernment of the configuration of the module more difficult. Protective layer 101 also protects the components of the anti-tamper module from physical damage and tampering by sealing the components inside.

In addition to impeding visual inspection of the anti-tamper module, the materials of protective layer 101 can be selected to impede other forms of inspection such as x-ray scanning. By mixing materials having different properties, arrangements and shapes into the protective layer, the contents and arrangement of the anti-tamper module can be obscured from x-ray scanning and other sophisticated scanning technologies. For example, a wire mesh encased in epoxy might be used to form the protective layer. While the epoxy prevents visual inspection, the wire mesh disguises the contents of the anti-tamper module from discernment using x-ray scanning. Other combinations of materials having desirable properties and benefits may be used in the protective layer without departing from the scope of the invention.

The foregoing description of the protective layer describes a passive anti-tamper mechanism provided by encasing the anti-tamper module with protective layer 101. Protective layer 101 can also be arranged to provide an active layer of protection. For example, using electrically conducting materials within the protective layer allows electrical circuits to be formed throughout the protective layer. Physical intrusion through the protective layer will break one or more of these electrical circuits causing an open circuit. Using a detector connected to the electrical circuits allows intrusion to be detected and appropriate action taken. Such action may include simply shutting down operation of the anti-tamper module. Additionally, detected intrusion may be used as a trigger event to initiate the execute of the reset or zeroization code described above.

Other methods of providing a protective layer can be used in alternative embodiments of the invention. For example, U.S. Pat. Nos. 5,539,379 and 5,858,500, which are assigned to W.L. Gore & Associates, Inc., and are incorporated herein by reference, describe protective enclosures that may be used within the context of the present invention. Other embodiments of the invention, may use one or more ground planes arranged as protective plates on one or more sides or ends of the anti-tamper module. These ground planes are typically made of a material such as copper. In addition to acting as a ground plane, the protective plates inhibit the ability to inspect and/or scan the contents of the anti-tamper module.

As described above, the present invention provides an anti-tamper module that uses multiple anti-tamper mechanisms to protect the contents of one or more integrated circuits incorporated within the module. The design and arrangement of the anti-tamper module described above does not require custom components and can be assembled using off-the-shelf components. This simplifies the design process and shortens the time required to produce anti-tamper modules.

The foregoing description of the invention illustrates and describes preferred embodiments of the present invention. However, it is to be understood that the invention is capable of use in various other combinations and modifications within the scope of the inventive concept as expressed herein, commensurate with the above teachings, and/or the skill or knowledge of the relevant art. The embodiments described hereinabove are further intended to explain best modes known of practicing the invention and to enable others killed in the art to utilize the invention in such, or other, embodiments and with the various modifications required by the particular applications or uses of the invention. Accordingly, the description is not intended to limit the scope of the invention, which should be interpreted using the following claims.

What is claimed is:

1. An anti-tamper module for protecting integrated circuit contents, the anti-tamper module comprising:
a connection layer having an input/output connector configured to connect the anti-tamper module to an external system;
an integrated circuit connected to the connection layer;
a memory connected to the connection layer and configured to store code for controlling access to contents of the integrated circuit;
an active protective layer encasing the anti-tamper module and configured to:
impede inspection of the anti-tamper module; and
detect physical intrusion into the active protective layer, wherein the active protective layer includes electrical circuits disposed within the active protective layer that are configured to be broken in response to the physical intrusion; and
a processor configured to execute a reset code in response to detection of the physical intrusion, wherein the reset code is configured to erase at least a portion of the code stored in the memory.

2. The anti-tamper module of claim 1, wherein the memory is non-volatile memory.

3. The anti-tamper module of claim 1, further comprising a power source configured to provide power to the anti-tamper module.

4. The anti-tamper module of claim 3, wherein the memory is volatile memory, and wherein the power source is further configured to provide power to maintain storage of the code in the memory.

5. The anti-tamper module of claim 3, further comprising:
an antenna; and
a wireless interface configured to receive the code via the antenna and to store the code in the memory.

6. The anti-tamper module of claim 5, wherein the antenna and the wireless interface are configured to generate power through inductance during reception of a radio frequency signal by the antenna.

7. The anti-tamper module of claim 1, wherein the code stored in the memory comprises a software key required to access the contents of the integrated circuit.

8. The anti-tamper module of claim 7, wherein the software key is a password.

9. The anti-tamper module of claim 8, wherein the software key is an executable algorithm.

10. The anti-tamper module of claim 1, further comprising a firmware key configured to control access to the contents of the integrated circuit.

11. The anti-tamper module of claim 1, wherein the input/output connector of the connection layer is not covered by the protective layer.

12. The anti-tamper module of claim 1, wherein the integrated circuit comprises a plurality of input/output connectors connected to respective input/output connectors of the connection layer, and wherein the plurality of input/output connectors of the integrated circuit and the respective input/output connectors of the connection layer differ.

13. The anti-tamper module of claim 1, wherein the connection layer, the integrated circuit, and the memory are arranged in a stacked configuration.

14. The anti-tamper module of claim 13, wherein:
a first of the connection layer, the integrated circuit, and the memory is on a first level of a stack;
a second of the connection layer, the integrated circuit, and the memory is on a second level of the stack positioned above the first level; and
a third of the connection layer, the integrated circuit, and the memory is on a third level of the stack positioned above the second level.

15. The anti-tamper module of claim 1, further comprising a plurality of vias, wherein each via of the plurality of vias connects at least two of the connection layer, the integrated circuit, and the memory.

16. The anti-tamper module of claim 1, further comprising a plurality of conductive traces or wires, wherein each of the plurality of conductive traces or wires extends along the edges of and connects at least two of the connection layer, the integrated circuit, and the memory.

17. An anti-tamper module for an integrated circuit, the anti-tamper module comprising:
a connection layer having a first plurality of input/output connectors configured to connect the anti-tamper module to an external system;
an integrated circuit having a second plurality of input/output connectors; and
a configurable logic device connected to the connection layer and to the integrated circuit, wherein the configurable logic device is configured to:
create logical circuits connecting at least one of the first plurality of input/output connectors of the connection layer to at least one of the second plurality of input/output connectors; and
execute reset code in response to a trigger event to set the configurable logic device to a default state and remove the created logical circuits, wherein the trigger event is indicative of an intrusion into the anti-tamper module.

18. The anti-tamper module of claim 17, wherein the configurable logic device comprises a field programmable gate array.

19. The anti-tamper module according to claim 17, wherein the configurable logic device comprises a field-programmable interconnect device.

20. The anti-tamper module of claim 17, wherein the configurable logic device is hardwired to create the logical circuits.

21. The anti-tamper module of claim 17, further comprising a power source configured to provide power to the anti-tamper module.

22. The anti-tamper module of claim 17, further comprising:
an antenna; and
a wireless interface configured to receive a trigger code via the antenna to trigger the configurable logic device to execute the reset code.

23. The anti-tamper module of claim 22, wherein the antenna and the wireless interface are configured to generate power through inductance during reception of a radio frequency signal by the antenna.

24. The anti-tamper module according to claim 17, further comprising a memory configured to store a software key required to access the integrated circuit.

25. The anti-tamper module of claim 24, wherein the configurable logic device comprises the memory configured to store the software key.

26. The anti-tamper module of claim 24, wherein the software key is a password.

27. The anti-tamper module of claim 24, wherein the software key is an executable algorithm.

28. The anti-tamper module of claim 17, further comprising a firmware key configured to control access to contents of the integrated circuit.

29. The anti-tamper module of claim 17, further comprising a protective layer encasing the anti-tamper module to impede inspection of the anti-tamper module, wherein the first plurality of input/output connectors of the connection layer are not covered by the protective layer.

30. The anti-tamper module of claim 29, further comprising a power source configured to provide power to the anti-tamper module; wherein the configurable logic device is further configured to execute the reset code to set the configurable logic device to a default state, thereby removing the logical circuits; and wherein the protective layer is an active layer configured to detect the intrusion into the protective layer, and wherein the configurable logic device is further configured to execute the reset code in response to the protective layer detecting intrusion.

31. The anti-tamper module of claim 17, wherein the second plurality of input/output connectors and the first plurality of input/output connectors differ.

32. The anti-tamper module of claim 17, wherein configuration data for configuring the configurable logic device is configured to be received from the external system.

33. The anti-tamper module of claim 17, wherein:
the connection layer, the integrated circuit, and the configurable logic device are arranged in a stacked configuration;
a first of the connection layer, the integrated circuit, and the configurable logic device is on a first level of a stack;
a second of the connection layer, the integrated circuit, and the configurable logic device is on a second level of the stack positioned above the first level; and
a third of the connection layer, the integrated circuit, and the configurable logic device is on a third level of the stack positioned above the second level.

34. The anti-tamper module of claim 17, further comprising a plurality of vias, wherein each of the plurality of vias connects at least two of the connection layer, the integrated circuit, and configurable logic device.

35. The anti-tamper module of claim 17, further comprising a plurality of conductive traces or wires, wherein each of the plurality of conductive traces or wires extends along the sides of and connects at least two of the connection layer, the integrated circuit, and the configurable logic device.

36. An anti-tamper module for protecting contents of an integrated circuit, the anti-tamper module comprising:
a connection layer having a first plurality of input/output connectors configured to connect the anti-tamper module to an external system;
an integrated circuit having a second plurality of input/output connectors;
a configurable logic device connected to the connection layer and to the integrated circuit, wherein the configurable logic device is configured to:
create logical circuits connecting at least one of the first plurality of input/output connectors to at least one of the second plurality of input/output connectors; and
execute reset code in response to a trigger event to set the configurable logic device to a default state and remove the created logical circuits, wherein the trigger event is indicative of an intrusion into the anti-tamper module; and
a memory configured to store code for controlling access to contents of the integrated circuit.

37. The anti-tamper module of claim 36, wherein the configurable logic device comprises a field-programmable gate array.

38. The anti-tamper module of claim 36, wherein the configurable logic device comprises a field-programmable interconnect device.

39. The anti-tamper module of claim 36, wherein the configurable logic device is hardwired to create the logical circuits.

40. The anti-tamper module of claim 36, wherein the memory is non-volatile memory.

41. The anti-tamper module of claim 36, further comprising a power source configured to provide power to the anti-tamper module.

42. The anti-tamper module of claim 41, wherein the memory is volatile memory, and wherein the power source is further configured to provide power to maintain storage of the code in the memory.

43. The anti-tamper module according to claim 36, further comprising:
an antenna; and
a wireless interface configured to receive the code via the antenna and to store the code in the memory.

44. The anti-tamper module of claim 43, wherein the antenna and the wireless interface are configured to generate power through inductance during reception of a radio frequency signal by the antenna.

45. The anti-tamper module of claim 36, further comprising a processor configured to execute the reset code to set the memory to a default state, thereby erasing the memory, wherein the processor is further configured to execute the reset code in response to the trigger event.

46. The anti-tamper module of claim 36, further comprising a software key required to access the contents of the integrated circuit.

47. The anti-tamper module of claim 46, wherein the software key is stored in the memory.

48. The anti-tamper module of claim 46, wherein the configurable logic comprises the memory configured to store the software key.

49. The anti-tamper module of claim 46, wherein the software key is a password.

50. The anti-tamper module of claim 46, wherein the software key is an executable algorithm.

51. The anti-tamper module of claim 36, further comprising a firmware key configured to control access to the contents of the integrated circuit.

52. The anti-tamper module of claim 36, further comprising a protective layer encasing the anti-tamper module and configured to impede inspection of the anti-tamper module, wherein the first plurality of input/output connectors of the connection layer are not covered by the protective layer.

53. The anti-tamper module of claim 52, further comprising:
a power source configured to provide power to the anti-tamper module; and
a processor configured to execute reset code to set the memory to a default state, thereby erasing the memory;
wherein the protective layer is an active layer configured to detect intrusion into the protective layer, and wherein the processor is further configured to execute the reset code in response to the protective layer detecting intrusion.

54. The anti-tamper module of claim 52, further comprising a power source configured to provide power to the anti-tamper module;
wherein the configurable logic device is configured to execute reset code to set the configurable logic device to a default state, thereby removing the logical circuits; and
wherein the protective layer is an active layer configured to detect intrusion into the protective layer, and wherein the configurable logic device is further configured to execute the reset code in response to the protective layer detecting intrusion.

55. The anti-tamper module according to claim 36, wherein the second plurality of input/output connectors and the first plurality of input/output connectors differ.

56. The anti-tamper module of claim 36, wherein configuration data for configuring the configurable logic device is configured to be received from the external system.

57. The anti-tamper module of claim 36, wherein:
the connection layer, the integrated circuit, the configurable logic device, and the memory are arranged in a stacked configuration;
a first of the connection layer, the integrated circuit, and the memory is on a first level of a stack;
a second of the connection layer, the integrated circuit, the configurable logic device, and the memory is on a second level of the stack positioned above the first level;
a third of the connection layer, the integrated circuit, the configurable logic device, and the memory is on a third level of the stack positioned above the second level; and
a fourth of the connection layer, the integrated circuit, the configurable logic device, and the memory is on a fourth level of the stack positioned above the third level.

58. The anti-tamper module of claim 36, further comprising a plurality of vias, wherein each of the plurality of vias connects at least two of the connection layer, the integrated circuit, the configurable logic device, and the memory.

59. The anti-tamper module of claim 36, further comprising a plurality of conductive traces or wires, wherein each of the plurality of conductive traces or wires extends along the sides of and connects at least two of the connection layer, the integrated circuit, the configurable logic device, and the memory.

60. The anti-tamper module of claim 1, further comprising a processor configured to execute reset code to set the memory to a default state in response to the active protective layer detecting the physical intrusion.

61. The anti-tamper module of claim 17, wherein a non-active portion of the configurable logic device is configured to store a reset code.

62. The anti-tamper module of claim 36, wherein the reset code is stored in a non-active portion of the configurable logic device.

63. The anti-tamper module of claim 17, wherein the configurable logic device is configured such that, when the configurable logic device is disconnected from power, there are no electrical connections between the first and second pluralities of input/output connectors.

* * * * *